(12) United States Patent
Mollier et al.

(10) Patent No.: US 12,460,721 B2
(45) Date of Patent: Nov. 4, 2025

(54) BLOCKING MECHANISM

(71) Applicant: VALEO EMBRAYAGES, Amiens (FR)

(72) Inventors: Christophe Mollier, Amiens (FR); Stéphane Longuent, Amiens (FR); Olivier Fafet, Amiens (FR); Alain Barry, Amiens (FR); Benoit Maurice, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/768,330

(22) Filed: Jul. 10, 2024

(65) Prior Publication Data

US 2025/0020207 A1 Jan. 16, 2025

(30) Foreign Application Priority Data

Jul. 11, 2023 (FR) ...................................... 2307448

(51) Int. Cl.
  *F16H 63/34* (2006.01)
  *F16H 57/02* (2012.01)
(52) U.S. Cl.
  CPC ............... *F16H 63/3425* (2013.01); *F16H 2057/02043* (2013.01); *F16H 63/3433* (2013.01)
(58) Field of Classification Search
  CPC ............... F16H 63/3416–3491; F16H 2057/02043–02047; B60T 1/005; B60T 1/062
  See application file for complete search history.

(56) References Cited

U.S. PATENT DOCUMENTS

| | | | | |
|---|---|---|---|---|
| 4,223,768 A | * | 9/1980 | Iwanaga | ............ F16H 63/3416 192/219.5 |
| 4,727,967 A | * | 3/1988 | Ogasawara | ............ B60T 1/005 192/219.5 |

(Continued)

FOREIGN PATENT DOCUMENTS

| | | |
|---|---|---|
| DE | 10 2019 101 467 A1 | 10/2019 |
| JP | H07144616 A * | 6/1995 |

(Continued)

OTHER PUBLICATIONS

Preliminary French Search Report issued Jan. 31, 2024 in French Application 2307448 filed on Jul. 11, 2023, 8 pages (with English Translation of Categories of Cited Documents & Written Opinion).

*Primary Examiner* — James J Taylor, II
(74) *Attorney, Agent, or Firm* — Oblon, McClelland, Maier & Neustadt, L.L.P.

(57) ABSTRACT

A blocking mechanism includes a transmission casing and a movable pawl having a locking finger. The movable pawl is pivotingly mounted about an axis on the transmission casing between a locking position in which the locking finger is engaged in the locking recess and a release position in which the locking finger is disengaged from said locking recess, the movable pawl including a cam surface. An actuator that moves a pushing device guided by a guide rail, wherein the pushing device includes a cam follower able to move on the cam surface. A housing is formed in the transmission casing including a positioning slot in which a wall of the guide rail is inserted.

13 Claims, 6 Drawing Sheets

(56) References Cited

U.S. PATENT DOCUMENTS

| | | | |
|---|---|---|---|
| 8,668,067 B2* | 3/2014 | Morisawa | F16H 63/3416 |
| | | | 192/219.5 |
| 9,409,551 B2* | 8/2016 | Isomura | B60T 1/005 |
| 11,713,809 B2* | 8/2023 | Nakamura | F16H 63/38 |
| | | | 192/219.4 |
| 2021/0396310 A1 | 12/2021 | Kraemer et al. | |
| 2022/0090678 A1 | 3/2022 | Morise | |

FOREIGN PATENT DOCUMENTS

| | | | | |
|---|---|---|---|---|
| JP | 2009208568 A * | 9/2009 | | F16H 63/3416 |
| WO | WO-2024132031 A1 * | 6/2024 | | F16H 63/3425 |

* cited by examiner

BLOCKING MECHANISM

TECHNICAL FIELD

The present invention relates to a blocking mechanism for rotationally blocking a shaft of a drivetrain of a mobility apparatus, such as motor vehicle for example.

TECHNOLOGICAL BACKGROUND

Blocking mechanisms are used, for example, as a parking brake for securing a stationary motor vehicle. In such a case, they make it possible to rotationally block a transmission shaft of the motor vehicle. Such blocking mechanisms are in particular used in motor vehicles with automatic transmission, in hybrid vehicles or electric vehicles.

Blocking mechanisms are known which comprise a pawl having a locking finger and pivotingly mounted on a transmission casing between a release position and a locking position in which the locking finger is inserted in a locking recess constrained to rotate with the transmission shaft to be blocked, notably from document FR3128754. The blocking mechanism further includes an actuator that moves a movable carriage which is guided in translation on the transmission casing by means of a guide rail. The movable carriage includes a roller which interacts with a cam surface of the pawl in such a way that a translational movement of the movable carriage causes the pawl to pivot. The guide rail is a piece of stamped sheet metal including several bent walls enabling it to be positioned by fitting into a housing formed in the transmission casing. More specifically, the guide rail has four walls bent to an angle of 90° to obtain an overall rectangular shape, and correspondingly the housing has four machined faces facing the four walls of the guide rail to ensure the positioning thereof.

Such a structure of the blocking mechanism is of simple design, easy to assemble and sufficiently robust to withstand the significant mechanical stresses that could occur when switching from the release position to the locking position.

However, such a structure poses several technical problems:
 the complex shape of the guide rail, on account of the large number of bent walls thereof, is difficult to manufacture;
 making the surfaces of the housing of the guide rail in the casing requires a large quantity of material to be removed by machining;
 the positioning of the guide rail in relation to the housing thereof in the casing is not precise enough as it is dependent on the sum of the manufacturing tolerances of a large number of geometric dimensions.

It is thus necessary to propose a blocking mechanism that is cheaper and easier to implement, and that enables the guide rail to be positioned more precisely.

SUMMARY

Hereinafter, ordinal adjectives are used to distinguish between features. They do not define the position of a feature. Consequently, for example, a third feature of a product does not mean that the product has a first and/or a second feature.

One idea forming the basis of the invention is a blocking mechanism for rotationally blocking a shaft of a vehicle.

One idea forming the basis of the invention is a blocking mechanism which makes it possible to solve one or more technical problems encountered in the prior art, for example the aforementioned problems.

The invention relates to a blocking mechanism able to rotationally block a shaft of a vehicle having at least one locking recess, the blocking mechanism comprising:
 a transmission casing including a housing, the housing including a first positioning face and a second positioning face, the first positioning face and the second positioning face forming a positioning slot;
 a movable pawl comprising a locking finger, the movable pawl being pivotingly mounted in a plane about a pivot axis on the transmission casing between a locking position in which the locking finger is engaged in the locking recess and a release position in which the locking finger is disengaged from said locking recess, the movable pawl comprising a cam surface;
 an actuator that moves a pushing device, the pushing device including a cam follower able to move on the cam surface to move the movable pawl from the release position to the locking position;
 a guide rail including a guide wall guiding the movement of the pushing device and a positioning wall;
 the positioning wall of the guide rail being inserted in the positioning slot of the housing.

These features guarantee very precise positioning of the guide rail in a chosen direction since this positioning depends directly and exclusively on two dimensions, specifically the dimension of the positioning wall and the dimension of the slot. Furthermore, the slot can be formed cheaply by a simple passage of a machine-tool, thereby significantly reducing the quantity of material to be machined in the housing.

According to an additional feature of the invention, the housing is formed in the material of the transmission casing.

According to an additional feature of the invention, the slot is made by a single machining operation using a cutting tool intended to machine the grooves, such as in particular a milling cutter, a face mill, or a slotting die.

According to an additional feature of the invention, the pushing device is a movable carriage including a first movable roller able to move along the guide wall of the guide rail and a second movable roller able to move on the cam surface of the movable pawl.

By virtue of these features, when the movable carriage is moving relative to the guide rail, the friction forces between the movable carriage and the guide rail are reduced. Therefore, movement of the movable carriage is ensured without causing wear to the movable carriage or the guide rail.

According to an additional feature of the invention, the pushing device is a one-piece end piece, for example a rounded or conical end, the one-piece end piece being able to move on the one hand over the guide wall of the guide rail and on the other hand on the cam surface of the movable pawl.

This feature enables the pushing device to perform its function with a small number of components and therefore at a reduced cost.

According to an additional feature of the invention, the positioning wall and the guide wall form a single wall, the positioning wall including at least one protuberance extending substantially in a direction parallel to the movement of the pushing device, the at least one protuberance facing the first positioning face and/or the second positioning face of the housing.

According to an additional feature of the invention, the positioning wall and the guide wall form a single wall, the positioning wall including at least two protuberances extending substantially in a direction parallel to the movement of the pushing device from the guide wall, the at least two protuberances facing the first positioning face and/or the second positioning face of the housing.

This feature provides several advantages:
- the single wall gives the guide rail a shape that is simple to manufacture, without bending or connection zones of complex geometry between the guide wall and the positioning faces;
- the guide wall is held directly by the slot in the housing, thereby enabling precise positioning of the pushing device relative to the pawl so as, on the one hand, to ensure reliable blocking and, on the other hand, to prevent excessively high loads from passing through the blocking mechanism and thus potentially damaging the latter.

The protuberances of the positioning wall are preferably smaller than the dimensions of the guide wall, for example the largest surface of a protuberance of the positioning wall is 10% to 30% smaller than the largest surface of the guide wall. These small protuberances reduce the positioning and flatness faults of the positioning wall during the manufacture of the guide rail. These small protuberances also limit the risk of the guide rail jamming during assembly thereof in the positioning slot of the housing.

According to an additional feature of the invention, the first positioning face of the housing and the second positioning face of the housing are parallel.

As a result of this feature, the bearing surface between the positioning slot of the housing and the positioning wall of the guide rail is increased to enable sufficient support to the loads passing through the blocking mechanism.

According to an additional feature of the invention, a width of the positioning slot, a thickness of the positioning wall, and an operating clearance equal to the difference between the width and the thickness are defined, the value of the operating clearance being between 0.05 mm and 1 mm, the value of the operating clearance being preferably between 0.2 mm and 0.6 mm.

The features of the invention facilitate implementation since it depends directly on the machining manufacturing tolerance of the slot and on the thickness tolerance of the guide wall. This reduces the tolerance of the operating clearance, which increases the precision of the positioning of the guide rail.

If the first positioning face of the housing and the second positioning face of the housing are not parallel, the width of the slot is understood to be the shortest distance between the first positioning face of the housing and the second positioning face of the housing.

According to an additional feature of the invention, the housing has a first side face facing and at a distance from a second side face and a first longitudinal face located between the first side face and the second side face, wherein the guide rail has, in a manner corresponding to the housing, a third side face facing and at a distance from a fourth side face and the guide wall extending longitudinally between the third side face and the fourth side face, and wherein the third side face, the fourth side face and the guide wall of the guide rail respectively face the first side face, the second side face and the first longitudinal face of the housing to limit the movement of the guide rail in all directions of the plane.

This arrangement is particularly advantageous since the various pressure loads exerted on the guide rail are supported by the faces of the housing and thus by the transmission casing. This arrangement makes it possible to retain the dimensions of the guide rail, while reducing the deformation thereof, and therefore the deterioration thereof over time.

Furthermore, this feature makes it simple and cheap to assemble and position the guide rail in the housing of the casing. The faces of the housing may for example be obtained by machining. The third side face and the fourth side face of the guide rail may for example each be obtained by means of a bending operation on a metal sheet.

According to an additional feature of the invention, an assembly clearance is formed between the first side face and the third side face, between the second side face and the fourth side face, and between the first longitudinal face and the guide wall, said assembly clearance preferably being between 0.2 mm and 1 mm.

This feature enables the selection of an assembly clearance that is on the one hand small enough to limit the movement of the guide rail in the housing, and on the other hand large enough to enable the easy insertion of the guide rail into the housing during the assembly operation.

According to an additional feature of the invention, the guide rail is fitted tightly into the housing.

According to an additional feature of the invention, the guide rail is fitted tightly into the housing by interposing a prestressed elastic part between the guide rail and the housing.

According to an additional feature of the invention, the guide rail includes two tabs bent to an angle of 90° in relation to the guide wall, each bent tab forming a side wall that bears one of the two side faces of the guide rail.

According to an additional feature of the invention, the guide rail includes a single tab bent to an angle of 90° in relation to the guide wall, the bent tab forming a side wall that bears the third side face of the guide rail, a cutout from the thickness of the guide wall forming the fourth side face of the guide rail.

According to an additional feature of the invention, a first cutout from the thickness of the guide wall forms the third side face of the guide rail, a second cutout from the thickness of the guide wall forms the fourth side face of the guide rail.

According to an additional feature of the invention, the guide rail is flat, a first cutout from the thickness of the guide wall forming the third side face of the guide rail, a second cutout from the thickness of the guide wall forming the fourth side face of the guide rail.

According to an additional feature of the invention, the guide rail includes only the guide wall, a first side wall and/or a second side wall.

The latter feature means that the guide rail does not include a bottom or a ceiling.

According to an additional feature of the invention, the guide wall, the first side wall, and/or the second side wall of the guide rail has a thickness of between 1.5 mm and 3.5 mm; preferably between 2.5 mm and 3 mm.

According to an additional feature of the invention, all of the walls of the guide rail are perpendicular to the plane.

According to an additional feature of the invention, the housing is machined to dimensions selected to position the guide rail and to limit the movement of said guide rail in all directions of the plane.

According to an additional feature of the invention, the height of the housing is between 15 mm and 30 mm.

According to an additional feature of the invention, the walls of the housing bearing the first longitudinal face, the first side face and the second side face have a thickness of between 3 mm and 10 mm.

According to an additional feature of the invention, the walls of the housing bearing the first longitudinal face, the first side face and the second side face may have stiffening members oriented perpendicularly to the first longitudinal face and/or to the first side face and/or to the second side face, the stiffening members being for example triangular.

This feature increases the strength of the housing against the loads passing through the blocking mechanism.

According to an additional feature of the invention, the casing is made using a casting process, notably aluminium or magnesium casting.

According to an additional feature of the invention, the first side face of the housing and/or the second side face of the housing do not have any common edges with the first longitudinal surface of the housing, the first side face of the housing, the second side face of the housing and the first longitudinal surface of the housing being obtained by a machining process and being connected together by walls of raw material.

This feature reduces the quantity of material to be machined. In the invention, raw material means material that has not been machined. For example, the raw material may come from a casting process. Advantageously, the minimum distance in the longitudinal direction between the first longitudinal surface of the housing and the first side face of the housing and/or between the first longitudinal surface of the housing and the second side face of the housing may be equal to or greater than the radius of the milling tool used for the machining process.

According to an additional feature of the invention, the walls of the guide rail and/or the walls of the housing may include chamfers or rounding to facilitate, during the assembly operation, the insertion of the guide rail into the housing in the direction perpendicular to the plane.

According to an additional feature of the invention, the height of the housing is between 15 mm and 30 mm.

According to an additional feature of the invention, the housing has a first notch, and the guide rail has a second notch, the first notch of the housing and the second notch of the guide rail being through-holes intended to enable the passage of the actuator.

According to an additional feature of the invention, the shape of the first notch and/or of the second notch is selected from: a recess, a cutout, an oblong hole, a groove or a slot.

According to an additional feature of the invention, the first notch in the housing is located on the first side face of the housing and the second notch in the guide rail is located on the third side face of the guide rail.

According to an additional feature of the invention, the guide rail comprises a non-return stop and/or an end-of-travel stop preventing the pushing device from moving beyond said guide rail.

By virtue of these features, the pushing device is held in the housing.

According to an additional feature of the invention, the non-return stop is formed by the third side face of the guide rail and/or the end-of-travel stop is formed by the fourth side face of the guide rail.

According to an additional feature of the invention, the positioning slot of the housing further includes at least one back face parallel to the plane, and correspondingly the positioning wall of the guide rail further includes at least one lower face parallel to the plane, the at least one lower face facing the at least one back face to limit the movement of the guide rail in a direction perpendicular to the plane.

According to an additional feature of the invention, a fastening means fastens the guide rail to the transmission casing, the fastening means blocking the movement of the guide rail in a direction perpendicular to the plane.

According to an additional feature of the invention, the fastening means is for example: a screw, a bolt/nut system, a rivet, an adhesive material, a stop attached to the housing or a stop obtained by plastic deformation of the housing.

According to an additional feature of the invention, the guide rail is made as a single piece from a bent metal strip, notably sheet steel.

According to an additional feature of the invention, the guide rail is made as a single piece by means of a sintering process applied to a metal.

According to an additional feature of the invention, the guide rail is made as a single piece by means of a casting process applied to a metal.

According to an additional feature of the invention, the guide rail is made of a metal that has undergone a hardening treatment, notably carbonitriding, nitriding, carburizing or quenching.

This feature increases the mechanical strength of the guide rail required to withstand the stresses transmitted to the blocking mechanism.

The invention also relates to a transmission system comprising a shaft having at least one locking recess and a blocking mechanism as defined above.

According to an additional feature of the invention, the shaft comprises a wheel including the at least one locking recess. For example, the wheel is a ratchet wheel.

According to an additional feature of the invention, the wheel includes 1 to 12 locking recesses.

According to an additional feature of the invention, the recesses are uniformly spaced apart from one another.

The invention further relates to a motor vehicle comprising a transmission system as defined above.

DESCRIPTION OF THE EMBODIMENTS

Throughout the figures, elements that are identical or perform the same function bear the same reference numbers.

The following embodiments are examples. Although the description refers to one or more embodiments, this does not necessarily mean that each reference relates to the same embodiment, or that the features apply only to one embodiment. Individual features of different embodiments can also be combined or interchanged in order to provide other embodiments.

A mechanism for rotationally blocking a shaft of a vehicle comprises in particular: a movable pawl, an actuator, a pushing device, a guide rail, and a casing comprising a housing. The blocking mechanism is notably intended to immobilize a vehicle, for example a car, when parked.

The various elements of the blocking mechanism according to various alternative embodiments are set out below.

Figure 1:
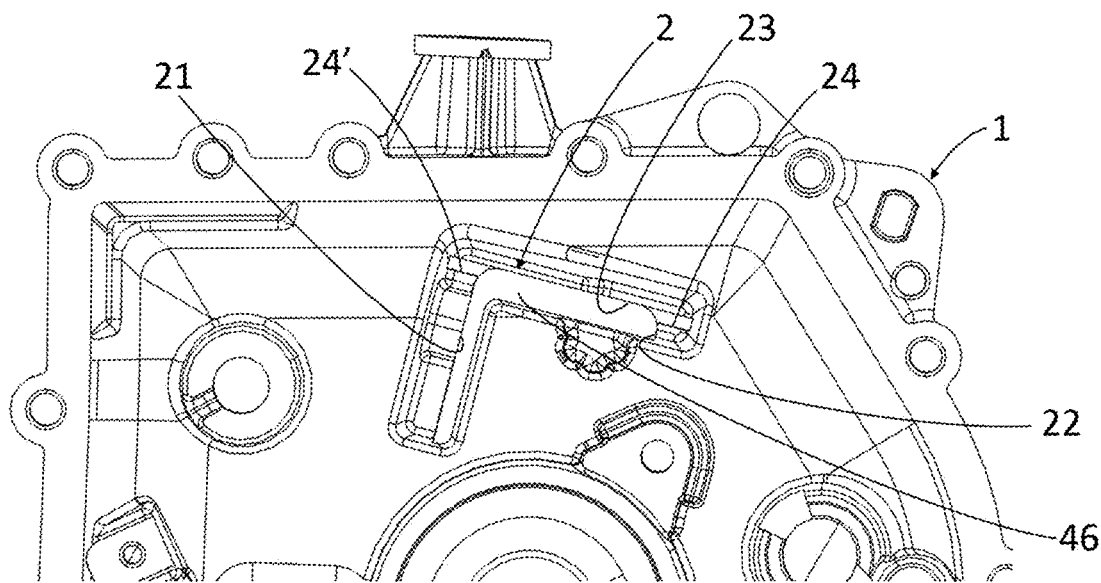
FIG. 1 is a front view of a portion of a transmission casing comprising a housing for the guide rail according to a first embodiment.
Figure 2:
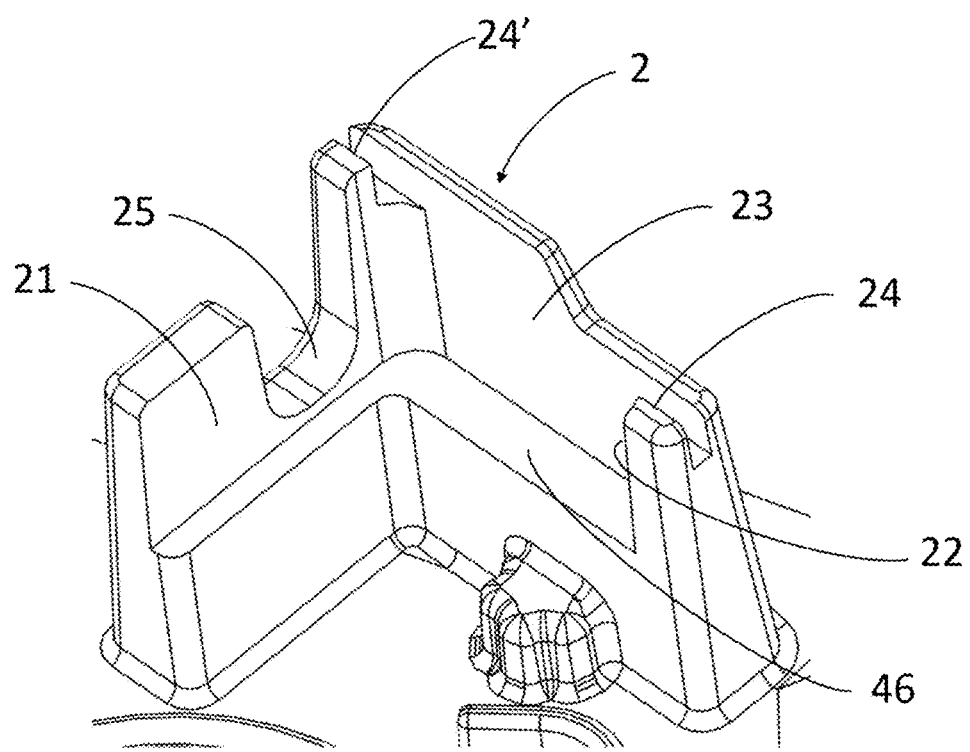
FIG. 2 is a perspective view of the housing in FIG. 1.

FIGS. 1 and 2 illustrate a transmission casing 1 (partially shown) comprising a housing 2 for the blocking mechanism of a vehicle according to a first embodiment.

The housing 2 is for example formed in the transmission casing 1, i.e. the housing is not a separate part which is fastened to the transmission casing 1. Indeed, the housing 2 may be hollowed out or made directly in the thickness of a wall of the transmission casing 1, for example by means of a casting process.

Figure 3:
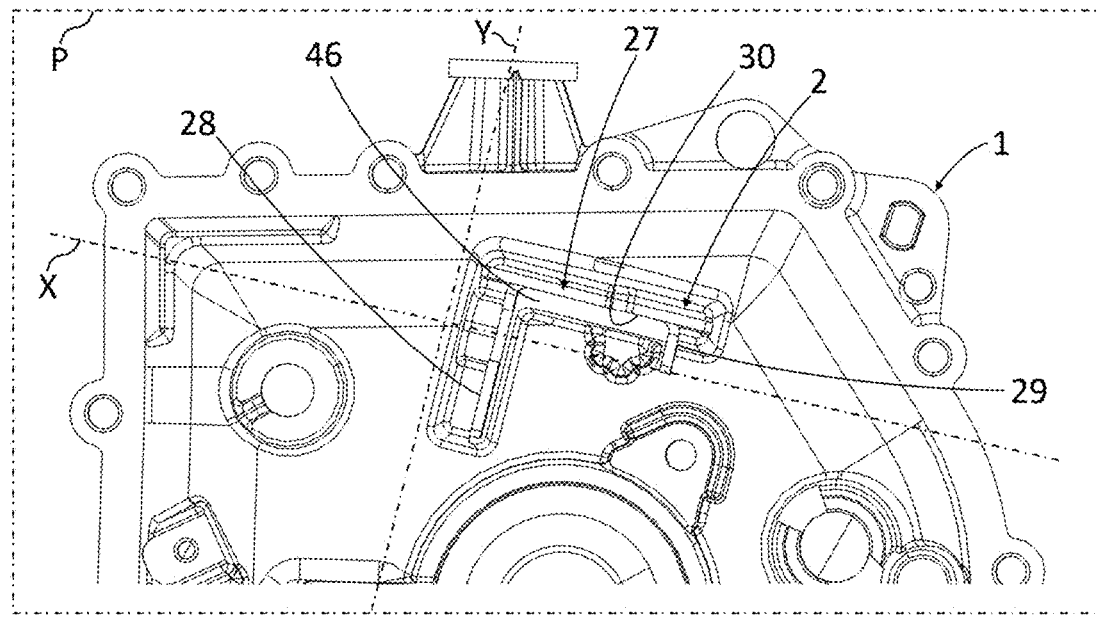
FIG. 3 is a front view of a portion of a transmission casing comprising a housing and a guide rail according to a first embodiment.
Figure 4:
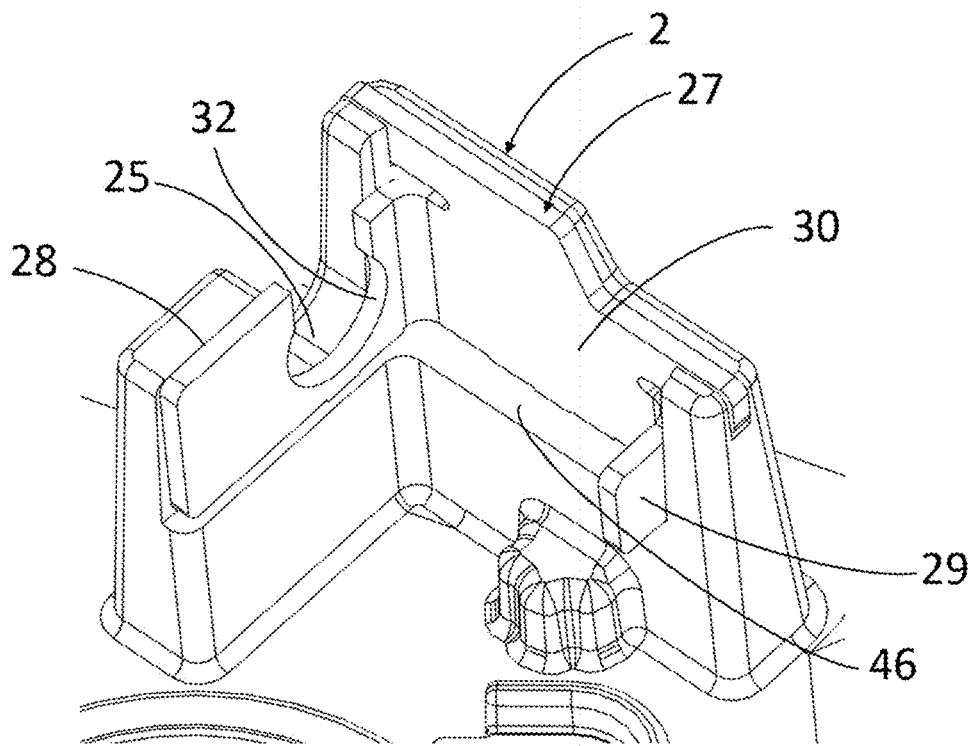
FIG. 4 is a perspective view of the casing portion and of the guide rail in FIG. 3.
Figure 5:
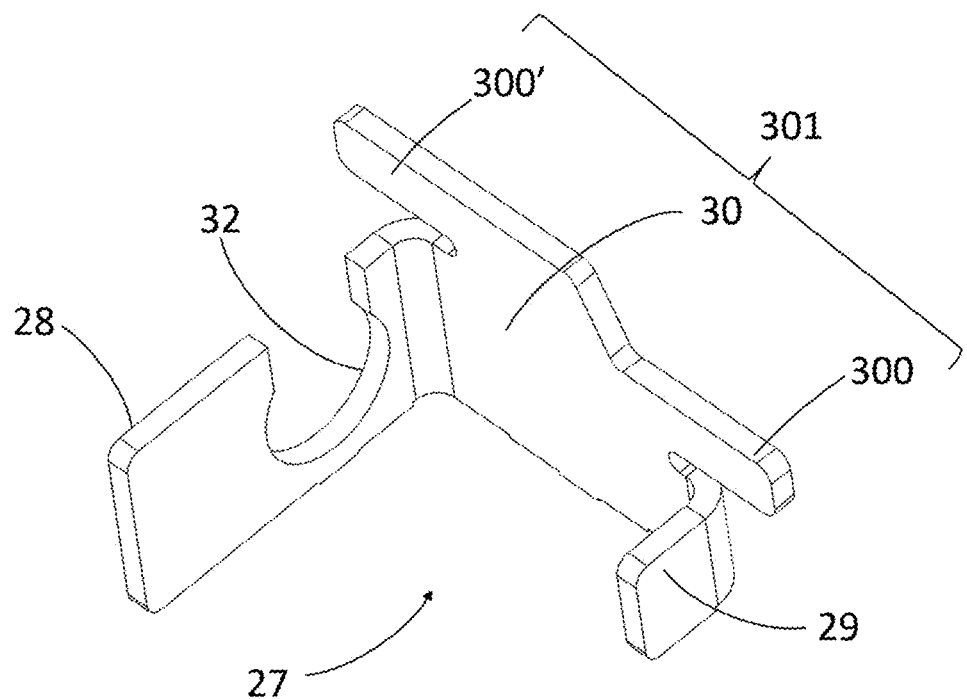
FIG. 5 is a first perspective view of the guide rail illustrated in FIGS. 3 and 4.

The housing 2 is intended to receive and position a guide rail, illustrated notably in FIGS. 3, 4 and 5. The housing 2 for example is overall L-shaped with rounded edges.

The housing 2 comprises a first side face 21 facing and at a distance from a second side face 22. The housing 2 further includes a longitudinal first positioning face 23 facing two second positioning faces 24 and 24'. The two second positioning faces 24 and 24' may be in one and the same plane and may be parallel to the first positioning face 23 to form a positioning slot.

FIGS. 3 and 4 illustrate a portion of a transmission casing 1 comprising the housing 2 as shown in FIGS. 1 and 2 and also illustrate a guide rail 27 housinged in the housing 2.

The guide rail 27 has dimensions similar to the housing 2 so as to be inserted in the housing 2, i.e. the guide rail 27 follows the contour of the housing 2. The guide rail is thus held in a static position inside the housing 2 in a plane P comprising a longitudinal direction X and a transverse direction Y perpendicular to the longitudinal direction X. In this arrangement, the various pressure loads exerted on the guide rail 27 can be supported by the faces of the housing 2 and thus by the transmission casing 1.

Figure 6:
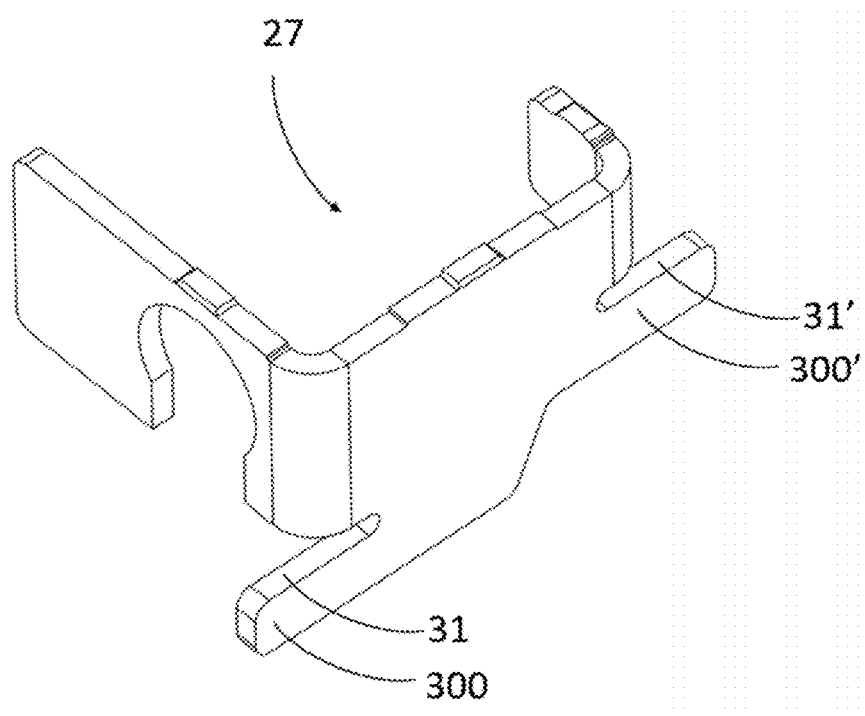
FIG. 6 is a second perspective view of the guide rail illustrated in FIGS. 3 and 4.

As illustrated notably in FIGS. 4, 5 and 6, the guide rail 27 may include a positioning wall comprising two protuberances 300 and 300' facing the first positioning face 23 on one side and the two second positioning faces 24 and 24' on the other side, to be inserted in the positioning slot of the housing 2 and thus position the guide rail in the transverse direction Y.

Similarly to the housing 2 as illustrated in FIGS. 1 and 2, the guide rail 27 illustrated in FIGS. 5 and 6 may have a third side face 28 facing and at a distance from a fourth side face 29, as well as a guide wall 30 extending longitudinally between the third side face 28 and the fourth side face 29.

The third side face 28, the fourth side face 29 and the guide wall 30 of the guide rail 27 may respectively face the first side face 21, the second side face 22 and the first longitudinal face 23 of the housing 2 to prevent the movement of the guide rail 27 in all directions of the plane P.

The two protuberances 300 and 300' may extend longitudinally and form a single wall 301 with the guide wall 30. The single wall 301 may be flat.

As illustrated in FIGS. 2, 4, 6 and 7, the positioning slot of the housing 2 may include two back faces 47, 47' parallel to the plane P, and correspondingly the two protuberances 300 and 300' of the guide rail 27 may include two lower faces 31, 31' parallel to the plane P, the two lower faces 31, 31' facing the two back faces 47, 47' to limit the movement of the guide rail in a direction perpendicular to the plane P.

Figure 7:
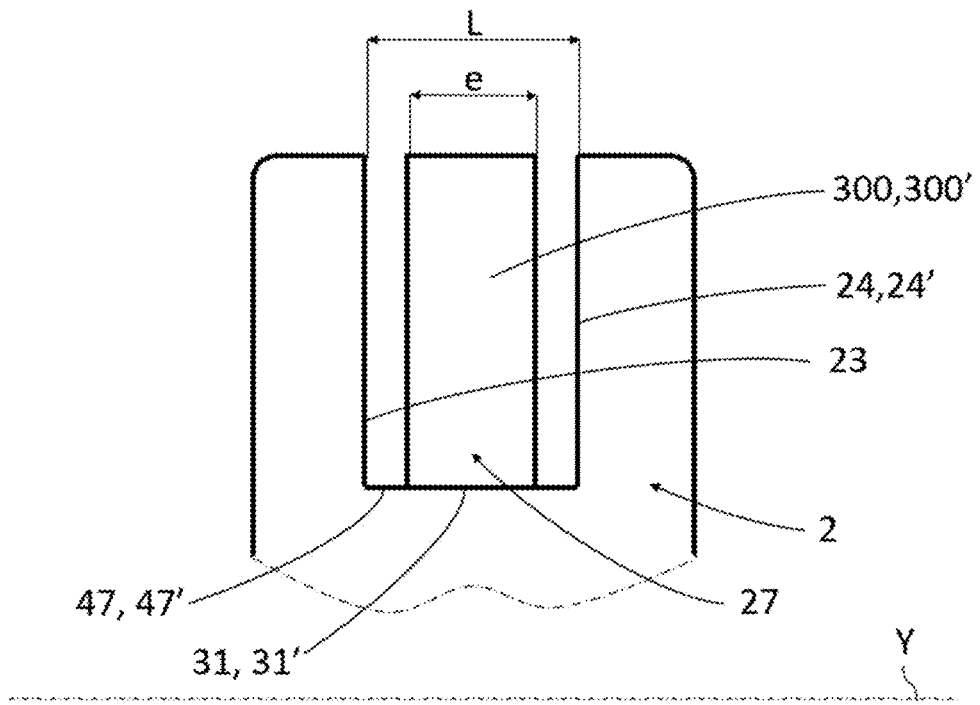
FIG. 7 is a schematic side view of the casing portion and of the guide rail in FIG. 4.

As illustrated schematically in FIG. 7, an operating clearance equal to the difference between the width L of the positioning slot and the thickness e of the positioning wall 300 is defined. The operating clearance may be of the order of 0.2 mm to 0.6 mm.

Figure 8:
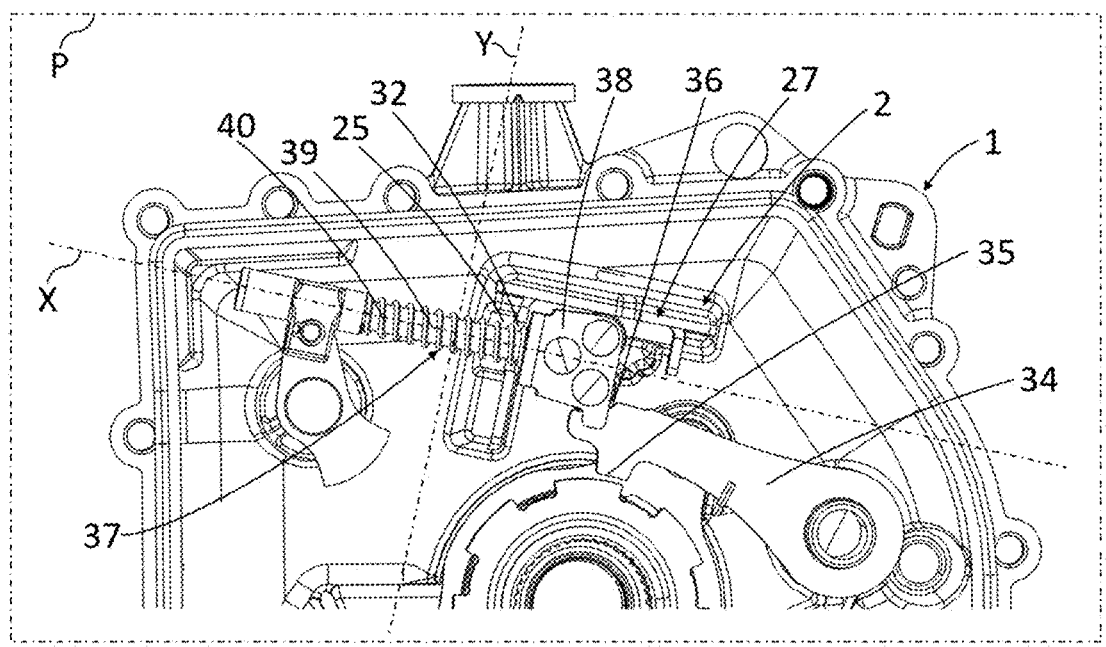
FIG. 8 is a front view of a portion of the blocking mechanism according to a first embodiment.
Figure 9:
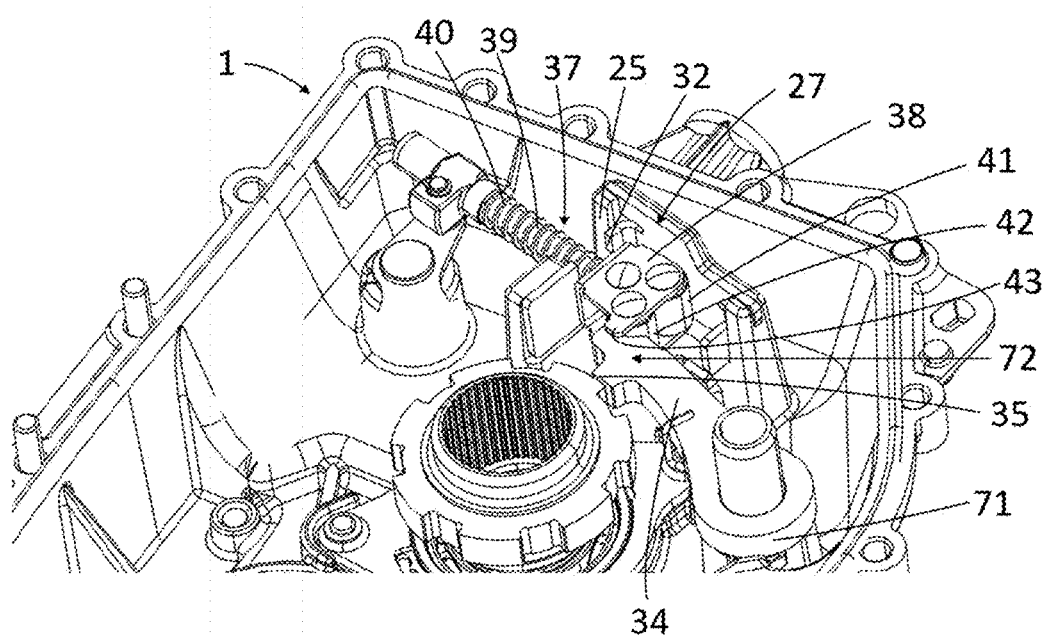
FIG. 9 is a perspective view of the blocking mechanism in FIG. 8.

Furthermore, the first side face 21 of the housing 2 may comprise a first notch 25 intended to enable the passage of an actuator, which is illustrated in FIGS. 8 and 9. The first notch 25 is for example U-shaped.

The third side face 28 of the guide rail 27 may comprise a second notch 32 with a shape corresponding to the shape of the first notch 25 in the housing 2, as illustrated in FIG. 4. The second notch 32 is for example intended to enable the passage of an actuator 37, which is shown in FIGS. 8 and 9.

The third side face 28 of the guide rail 27 may be a non-return stop for the pushing device 38, illustrated in FIGS. 8 and 9, so that the pushing device is retained in translation in the axis X in the housing 2, by the guide rail 27.

The guide rail 27 serves to guide the pushing device 38 and may ensure that it only performs the translational movement necessary to actuate a locking finger in a locking recess so that the blocking mechanism is in a locking position. The locking position allows a motor vehicle to be parked, for example.

The guide rail may be made for example from a metal strip which is on the one hand cut so as to form the second notch 32 then bent twice lengthwise to form said walls of which it is composed. The metal strip, before bending, may also comprise a notch intended to form the second notch 32 in the guide rail. The thickness of the metal strip is for example of the order of 3 mm.

FIGS. 8 and 9 are partial views of a mechanism for rotationally blocking a shaft in a release position.

The blocking mechanism comprises the housing 2 as shown in FIGS. 1 to 4 and the guide rail 27 as shown in FIGS. 3 to 6. The blocking mechanism may further comprise a movable pawl 34 located in the transmission casing 1.

The movable pawl 34 may have an elongate shape and have a first end 71 and a second end 72 at a distance from the first end 71.

The first end 71 for example enables the movable pawl 34 to be fastened to the transmission casing 1 while allowing the rotational movement of said movable pawl 34. In other words, the movable pawl is pivotingly mounted in a plane P about a pivot axis.

The second end 72 may be located at the opening 33 in the guide rail 27 and at the opening 26 of the housing. The second end 72 may comprise a cam surface 36 located on a fifth side face of the movable pawl 34, towards the inside of the housing 2. The second end 72 may further comprise a locking finger 35 projecting towards the outside of the housing 2 from a sixth side face of the movable pawl 34. The locking finger 35 is intended, when the blocking mechanism is triggered, to be inserted in a locking recess 45, shown in FIG. 12. The locking recess 45 is for example located on a ratchet wheel 44 which is capable of receiving said locking finger 35, as illustrated in FIG. 12, and which is constrained to rotate with the transmission shaft 60 to be rotationally blocked.

Figure 12:
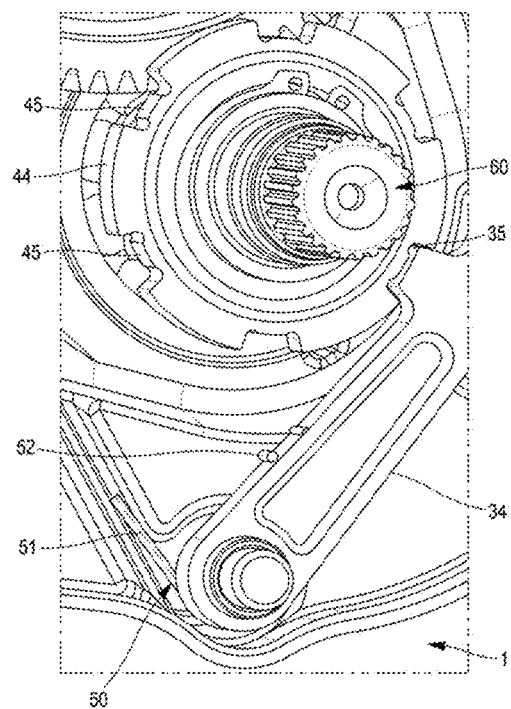
FIG. 12 is a perspective view of a rotationally blocked shaft of a vehicle.

According to a variant shown in FIG. 12, the movable pawl 34 may further comprise a torsion spring 50. The torsion spring 50 is for example wound at the first end 71 of the movable pawl 34. The torsion spring 50 may comprise a first end portion 51 which bears against a bearing surface of the transmission casing and a second end portion 52 which bears against a bearing surface of the movable pawl 34. The torsion spring 50 is arranged so as to exert a return force on the movable pawl 34 so as to return the same towards the release position. The blocking mechanism may further comprise an actuator 37, shown partially in FIG. 7, which is fastened to the transmission casing 1. The actuator 37 may comprise a rod 39 capable of moving in the longitudinal direction X.

The rod 39 may extend through the first notch 25 in the housing 2 and the second notch 32 in the guide rail 27 as far as an internal space in the housing 2. The rod 39 may be fastened to the pushing device 38 located in the housing 2.

The pushing device 38 is intended to be guided by the guide rail 27.

In the cases where the pushing device 38 is pushed back by the movable pawl 34 during dynamic phases, the pushing device 38 may butt against the third side face 28 of the guide rail 27, which thus forms a non-return stop for the pushing device 38. The pushing device 38 is in this case pushed against the movable pawl 34 by a return force exerted by a traction spring 40 which surrounds the rod 39 and which includes a first end fastened to the body of the actuator and a second end fastened to the pushing device 38. This effect may for example be produced when engagement is attempted at excessively high speed. Beyond a threshold speed, for example between 3 km/h and 5 km/h, the movable pawl 34 springs back so as to prevent engagement, and the pushing device 38 is thus pushed back into abutment.

In the embodiment in FIGS. 8 and 9, the pushing device 38 may be a movable carriage that for example comprises a first movable roller 41 that is able to move along the first longitudinal wall 30 of the guide rail 27. The pushing device 38 may further comprise a cam follower 42 including a second movable roller which is in contact with the cam surface 36 of the movable pawl 34 and capable of moving along this cam surface 36.

The pushing device 38 may further comprise a lug 43 located at the second end of the movable pawl 34. The lug 43 is intended to keep the movable pawl 34 in the plane P.

In order to move the movable pawl 34 into the locking position, the rod 39 of the actuator 37 may be moved through the second notch 32 in the guide rail 27 thus moving the pushing device 38 in a longitudinal direction. The pushing device 38 may be moved from the third side face 28 of the guide rail 27 towards the fourth side face 29 of the guide rail 27. The movement of the pushing device 38 may cause the first movable roller 41 to move along the first longitudinal wall 30 of the guide rail 27 and the cam follower 42 to move along the cam surface 36 of the movable pawl 34. The cam surface 36 may have a slope and the movement of the pushing device 38 may thus exert pressure towards the cam surface 36 of the movable pawl 34. This pressure may cause a rotational movement of the second end of the movable pawl 34 towards a locking recess in such a way that the locking finger 35 may become engaged in a locking recess, for example on a ratchet wheel as illustrated in FIG. 12, so as to lock said ratchet wheel 44.

FIG. 12 shows a transmission casing 1 comprising a ratchet wheel 44. The ratchet wheel 44 may have a plurality of recesses 45 spaced apart uniformly from one another, all the way around the ratchet wheel 44. Each recess 45 of the plurality of recesses may have appropriate dimensions to receive the locking finger 35 of the movable pawl 34. FIG. 12 also illustrates a shaft 60 of a vehicle which is rotationally blocked by the blocking mechanism.

To move the blocking mechanism from the locking position into the release position, the rod 39 may be moved in such a way as to move the pushing device 38 towards the third side face 28 until it butts against the third side face 28 of the guide rail 27. The locking finger 35 may be disengaged from the locking recess on the ratchet wheel 44, which releases said ratchet wheel and thus allows rotation of the transmission shaft 60.

Figure 10:
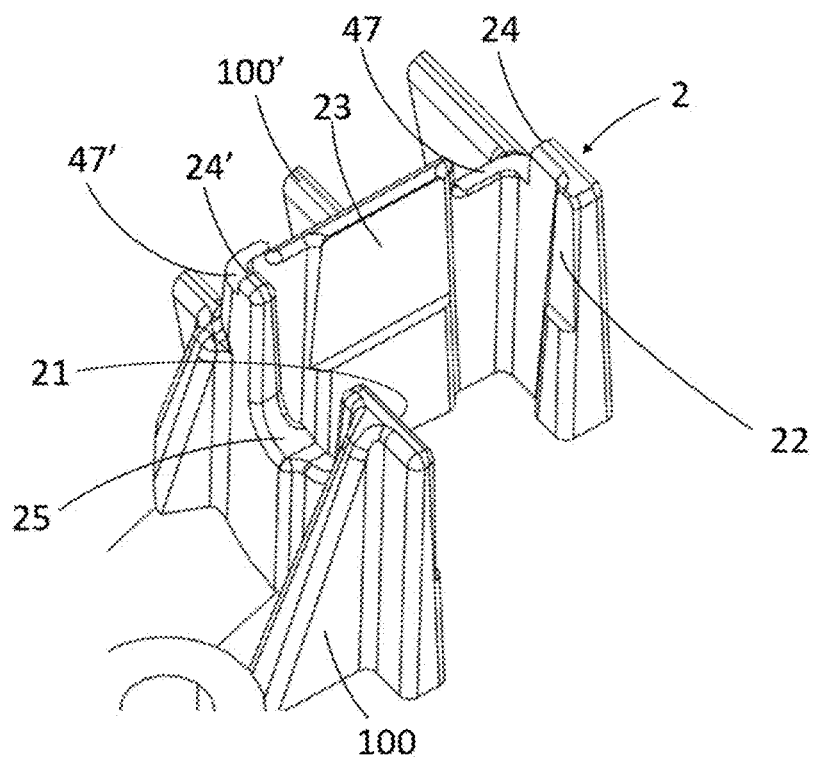
FIG. 10 is a perspective view of a housing according to a second embodiment.
Figure 11:
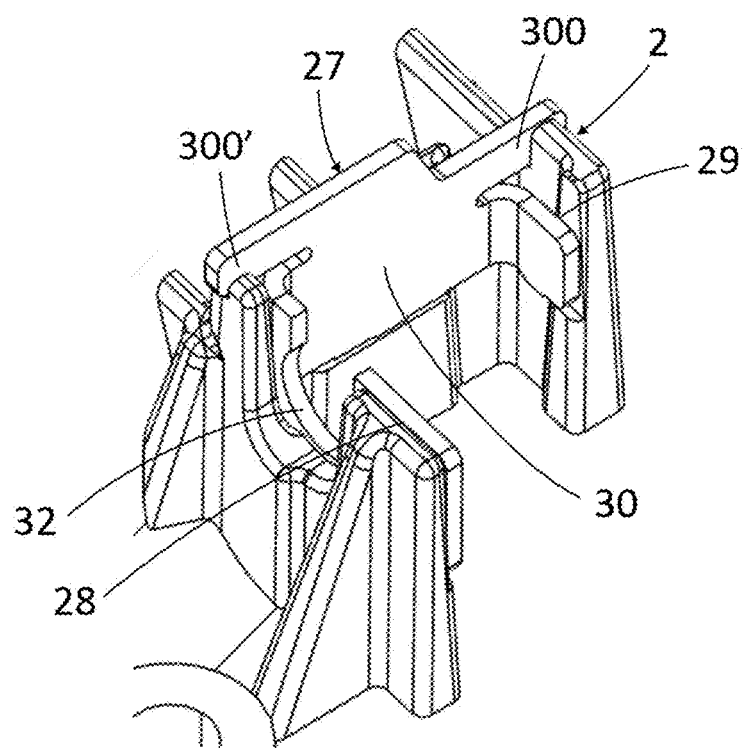
FIG. 11 is a perspective view comprising the guide rail inserted into the housing in FIG. 10.

FIGS. 10 and 11 illustrate a second embodiment of the housing 2, into which the guide rail 27 has just been inserted. In this embodiment, the manufacturing process has been improved over the first embodiment of the housing 2 in FIG. 2 in order to reduce the quantity of material removed to make the housing. The first side face 21 of the housing and the second side face 22 of the housing do not have any common edges with the first longitudinal surface 23 of the housing, the first side face 21 of the housing, the second side face 22 of the housing and the first longitudinal surface 23 of the housing for example being obtained by a machining process and being connected together by walls of raw casting material.

In the embodiment in FIG. 10, the different walls formed from the casing that bear the faces of the housing may be of somewhat similar thicknesses, varying for example from 4 mm to 6 mm, in order to improve castability during the casting process. These walls may have stiffening members 100, 100' oriented perpendicularly to the first longitudinal face 23 and/or to the first side face 21 and/or to the second side face 22, the stiffening members being for example triangular.

It must be noted that all of the features, as they appear to a person skilled in the art on the basis of the present description, the drawings and the accompanying claims, even if in practice they have only been described in relation to other given features, both individually and according to any combination, may be combined with other features or groups of features disclosed herein, provided that this has not been expressly excluded and that technical circumstances do not make such combinations impossible or pointless.

Use of the verbs "comprise" or "include" and their conjugated forms does not exclude the presence of elements or steps other than those described in a claim.

In the claims, any reference sign between parentheses should not be interpreted as limiting the claim.

The invention claimed is:

1. A blocking mechanism able to rotationally block a shaft of a vehicle having at least one locking recess, the blocking mechanism comprising:
   a transmission casing including a housing, the housing including a first positioning face and a second positioning face, the first positioning face and the second positioning face forming a positioning slot;
   a movable pawl comprising a locking finger, the movable pawl being pivotingly mounted in a plane about a pivot axis on the transmission casing between a locking position in which the locking finger is engaged in the locking recess and a release position in which the locking finger is disengaged from said locking recess, the movable pawl comprising a cam surface;
   an actuator that moves a pushing device, the pushing device including a cam follower able to move on the cam surface to move the movable pawl from the release position to the locking position; and a guide rail including a guide wall guiding the movement of the pushing device and a positioning wall, wherein the positioning wall of the guide rail is inserted in the positioning slot of the housing, and wherein the positioning wall and the guide wall form a single wall both extending substantially in a direction parallel to the movement of the pushing device, the positioning wall including at least one protuberance extending substantially in the direction parallel to the movement of the pushing device from the guide wall, the at least one protuberance facing the first positioning face and/or the second positioning face of the housing.

2. The blocking mechanism according to claim 1, wherein the positioning wall includes at least two protuberances extending substantially in the direction parallel to the movement of the pushing device, the at least two protuberances facing the first positioning face and/or the second positioning face of the housing.

3. The blocking mechanism according to claim 1, wherein the first positioning face of the housing and the second positioning face of the housing are parallel.

4. The blocking mechanism according to claim 1, wherein a width of the positioning slot, a thickness of the positioning wall, and an operating clearance equal to a difference between the width and the thickness are defined, a value of the operating clearance being between 0.05 mm and 1 mm.

5. The blocking mechanism according to claim 1, wherein the housing has a first side face facing and at a distance from a second side face and the first positioning face serves a first longitudinal face located between the first side face and the second side face, wherein the guide rail has, in a manner corresponding to the housing, a third side face facing and at a distance from a fourth side face and the guide wall extending longitudinally between the third side face and the fourth side face, and wherein the third side face, the fourth side face and the guide wall of the guide rail respectively face the first side face, the second side face and the first longitudinal face of the housing to limit the movement of the guide rail in all directions of the plane.

6. The blocking mechanism according to claim 5, wherein the first side face of the housing and/or the second side face of the housing do not have any common edges with the first longitudinal face of the housing, the first side face of the housing, the second side face of the housing and the first longitudinal face of the housing being obtained by a machining process.

7. The blocking mechanism according to claim 1, wherein the housing has a first notch, and wherein the guide rail has a second notch, the first notch of the housing and the second notch of the guide rail being through-holes intended to enable passage of the actuator.

8. The blocking mechanism according to claim 1, wherein the guide rail comprises a non-return stop and/or an end-of-travel stop preventing the pushing device from moving beyond said guide rail.

9. The blocking mechanism according to claim 8, wherein the housing has a first side face facing and at a distance from a second side face and the first positioning face serves a first longitudinal face located between the first side face and the second side face, wherein the guide rail has, in a manner corresponding to the housing, a third side face facing and at a distance from a fourth side face and the guide wall extending longitudinally between the third side face and the fourth side face, wherein the third side face, the fourth side face and the guide wall of the guide rail respectively face the first side face, the second side face and the first longitudinal face of the housing to limit the movement of the guide rail in all directions of the plane, and wherein the non-return stop is formed by the third side face of the guide rail and/or the end-of-travel stop is formed by the fourth side face of the guide rail.

10. The blocking mechanism according to claim 1, wherein the positioning slot of the housing further includes at least one back face parallel to the plane, and the positioning wall of the guide rail further includes at least one lower face parallel to the plane, the at least one lower face facing the at least one back face to limit the movement of the guide rail in a direction perpendicular to the plane.

11. The blocking mechanism according to claim 1, wherein a fastening means fastens the guide rail to the housing, the fastening means blocking the movement of the guide rail in a direction perpendicular to the plane.

12. The blocking mechanism according to claim 1, wherein the guide rail is made as a single piece from a bent metal strip or sheet steel.

13. A transmission system comprising a shaft having at least one locking recess and one blocking mechanism according to claim 1.

* * * * *